United States Patent
Tsujishita

[11] Patent Number: 5,873,441
[45] Date of Patent: Feb. 23, 1999

[54] DRIVE TRANSMISSION SYSTEM

[75] Inventor: Yoji Tsujishita, Nagaokakyo, Japan

[73] Assignee: Murata Kikai Kabushiki Kaisha, Kyoto, Japan

[21] Appl. No.: 784,900

[22] Filed: Jan. 16, 1997

[30] Foreign Application Priority Data

Feb. 9, 1996 [JP] Japan .................................. 8-024387

[51] Int. Cl.⁶ .............................. F16D 1/108; H04N 1/00
[52] U.S. Cl. ......................... 192/46; 192/69.8; 192/93 A; 271/10.13; 271/116
[58] Field of Search .............................. 192/69.8, 69.81, 192/93 A, 46; 271/10.13, 116

[56] References Cited

U.S. PATENT DOCUMENTS

| | | | |
|---|---|---|---|
| 344,611 | 6/1886 | Applegate | 192/69.81 |
| 1,114,716 | 10/1914 | Annable | 192/93 A X |
| 3,397,588 | 8/1968 | Johnson | 192/46 X |
| 3,433,337 | 3/1969 | Salter | 192/46 |
| 4,261,452 | 4/1981 | Barrows | 192/46 X |
| 4,595,274 | 6/1986 | Sakurai | 399/331 |
| 5,222,723 | 6/1993 | Ijuin | 271/10.11 |
| 5,240,239 | 8/1993 | Kim | 271/116 X |
| 5,259,607 | 11/1993 | Hironori et al. | 271/116 X |
| 5,624,109 | 4/1997 | Tanaka | 271/10.13 |

*Primary Examiner*—Rodney H. Bonck
*Attorney, Agent, or Firm*—Armstrong, Westerman, Hattori, McLeland & Naughton

[57] ABSTRACT

A low cost drive transmission system provided with one-way clutch having a simple assembly and not requiring precision parts. A drive shaft 31 and a shaft 45 are connected via a link cam 30. A main cam 34 is formed on the drive shaft 31 and the link cam 30 is moved in a thrust movement along the free shaft 45 by the cam effects of the guide surfaces 50*a*, 50*b*, 53*a*, 53*b* between the link cam 30 and the main cam 34. The link cam 30 engages with an engagement pin 50 formed on the shaft 45, thus transmitting the driving of the drive shaft 31 side. Conversely, when the shaft 45 rotates faster in the advancement direction than the rotational velocity transmitted from the drive shaft 31, a thrust movement along the free shaft 45 in the opposite direction is exerted on the link cam 30 as a result of actions opposite to the above and the engagement with the engagement pin 50 is broken. Thus, the transmission of the driving of the shaft 45 from the drive shaft 31 disappears and no braking action is exerted on the drive shaft 31.

5 Claims, 12 Drawing Sheets

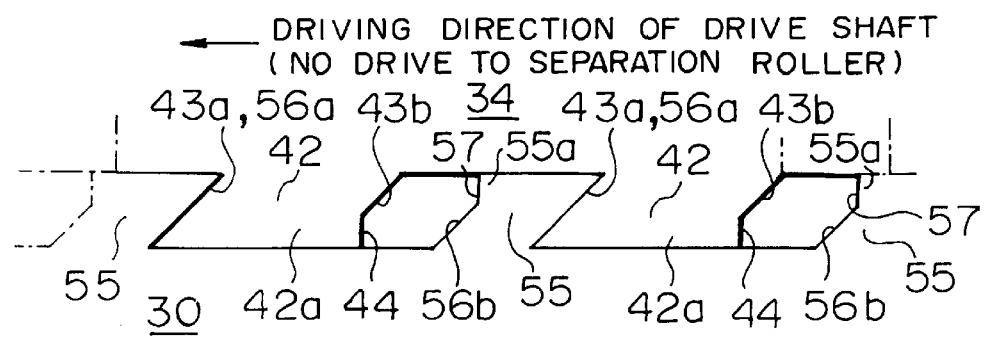
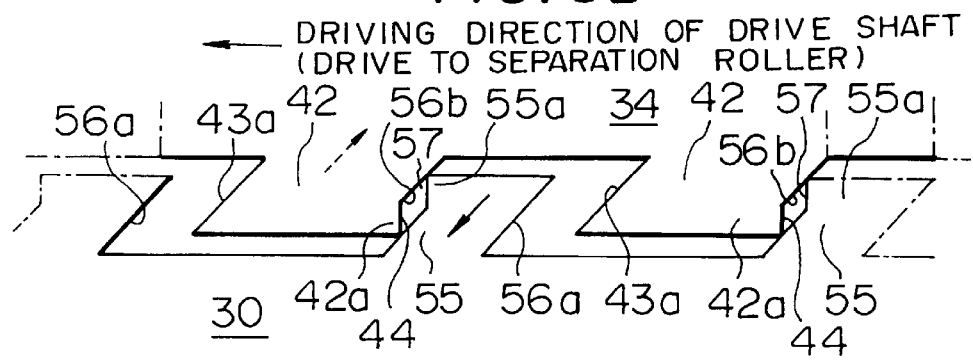
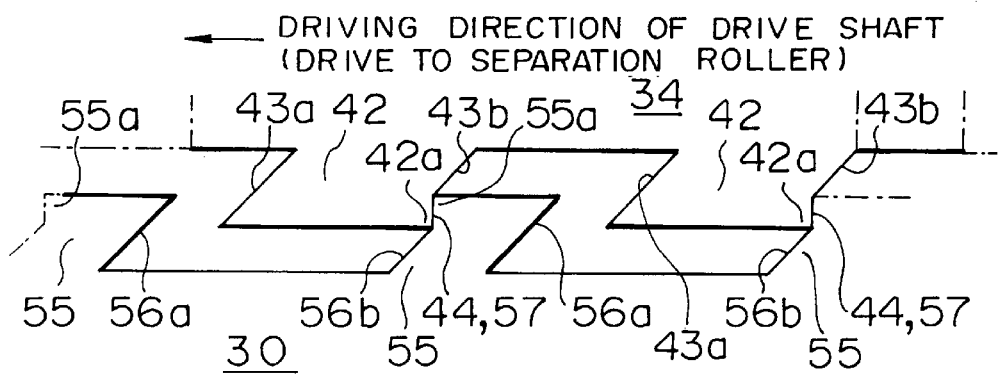
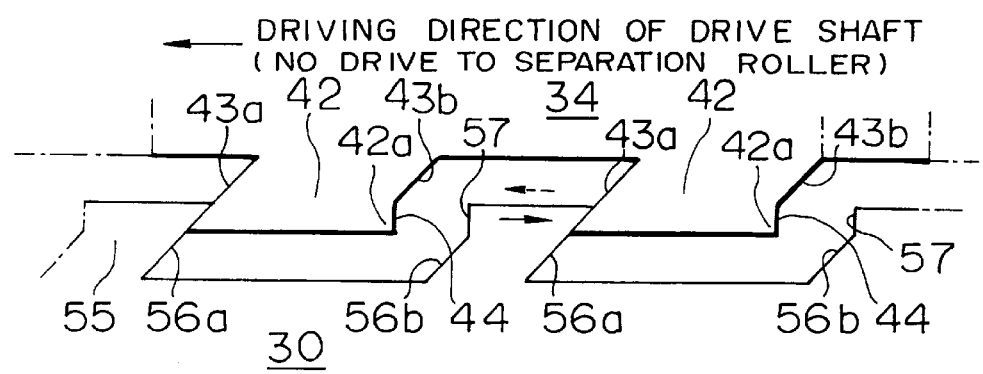

→ THRUST MOVEMENT

--→ } ROTATION MOVEMENT

→ THRUST MOVEMENT

--→ } ROTATION MOVEMENT

FIG. II
PRIOR ART
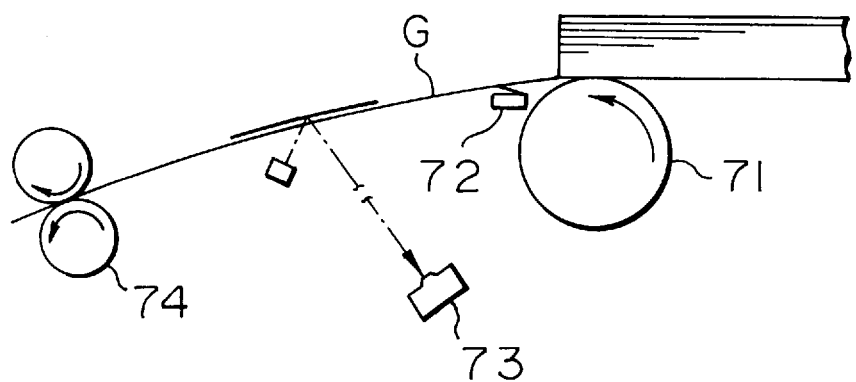

DRIVE TRANSMISSION SYSTEM

BACKGROUND OF THE INVENTION

1. Field of the Invention

The present invention relates to a drive transmission system provided with a one-way clutch which rotates by being driven like a separation roller that moves the cut paper of a facsimile device for example, and idles when rotated in an advancement direction faster than the rotational velocity.

2. Description of the Related Art

For example, on a document supply system of a facsimile device, a document is set in the tray, sent in the direction of an image sensor and scanning is carried out. Accordingly, the following occurs in sequential order. As shown in FIG. 11, the separation roller 71 is driven and a bottom-most document G is sent downstream. When the document G is initially transported along the movement pathway, a passage sensor 72 detects the leading edge of the paper. The document G being moved along the movement pathway then arrives at the conveyance roller 74. The rotational velocity of the conveyance roller 74 is set slightly faster than that of the separation roller 71 and as a result of difference in velocity, the document G is pulled downstream by the conveyance roller 74. As a result, a difference in the conveyance speed between the first document and the next document delivered by the separation roller 71 is generated, thus forming a gap between the documents G. As a result of this, the passage sensor 72 is able to detect the trailing edge of the document G currently being transported and accordingly, the size and number of pages of the scanned document may be detected. Thus, in order to allow the pulling of the document G when pulled by the conveyance roller 74, a one-way clutch system is provided wherein the separation roller 71 idles with respect to the rotation in the advancement direction.

On conventional systems as shown in FIGS. 12A and 12B, a clutch spring 77 is attached to a metal shaft 75 attached to the separation roller 71. This clutch spring 77 is fitted into the drive gear 78 so that it moves freely. When the drive force of the gear 78 is transmitted to the shaft 75, the clutch spring 77 is reduced in diameter and contacts the outer periphery 78a of the cylindrical base of the gear 78. Thus, driving is transmitted to the shaft 75 via the clutch spring 77. Conversely, if the separation roller 71 is allowed to rotate freely in an advancement direction, the clutch spring 77 expands and does not come into contact with the outer periphery 78a of the cylindrical base of the gear 78. In short, when the separation roller 71 is rotated in the advancement direction, the shaft 75 freely rotates without driving being transmitted to the shaft 75.

Furthermore, there are also conventional driving systems not having one-way clutch systems as shown in FIGS. 13A and 13B. This involves the arrangement of a first engagement peg 80 on one part of the outer periphery of a resinous shaft 79 attached to the separation roller 71 and the arrangement of a second engagement peg 82 on one part of the outer periphery of the drive side gear shaft 81. When the driving is transmitted from the gear shaft 81 to the shaft 79, the second engagement peg 82 contacts the first engagement peg 80 from behind and both pegs engage together. Then driving is transmitted by the second engagement peg 82 pushing the first engagement peg 80 when the gear shaft 81 rotates. Conversely, when the rotation of the shaft 79 is faster than the rotation of the gear shaft 81 due to the document G being pulled by the conveyance roller 74, as the separation roller 71 starts freely rotating in the advancement direction, the first engagement peg 80 separates from the second engagement peg 82. Then, if the separation roller 71 (shaft 79) makes approximately one revolution ahead of the gear shaft 81, the first engagement peg 80 engages with the second engagement peg 82. When the document G is ejected from the conveyance roller 74, the separation roller 71 stops. At that time, even if the gear shaft 81 rotates, the separation roller 71 stays in a stopped state until the second engagement peg 82 has once again engaged with the first engagement peg 80 by rotating 360 degrees. Then the document G delivery operation is repeated with the second engagement peg 82 once again in contact with the first engagement peg 80 from behind.

However, the following problems exist with the drive transmission systems as described above.

(1) On the system shown in FIGS. 12A and 12B:
    a. Clutch spring 77 is used as the necessary part of the one-way clutch system but this part has comparatively high costs,
    b. As contact is made with the outer periphery 78a of the cylindrical base of the gear 78 due to slight changes in diameter, a high degree of precision is required for the dimensions of the part,
    c. Time is required for the contact operation of the clutch spring 77,
    d. Abrasion of the outer periphery 78a of the gear 78 occurs over the passage of time as the clutch spring 77 transmits the driving by friction,
    e. As the drive transmission is carried out by friction, leakage of machine oil would cause free rotation resulting in unreliable transmission leading to instability in the operations, and
    f. Permeation of water causes rusting, etc.

(2) On the system shown in FIGS. 13A and 13B;

When the rotation of the shaft 79 is faster than the rotation of the gear shaft 81, if the separation roller 71 (shaft 79) makes one rotation ahead of the gear shaft 81, the first engagement peg 80 of the shaft 79 engages with the second engagement peg 82 of the gear shaft 81. In short, because this is not a one-way clutch system, a load from the gear shaft 81 (being a braking action) is normally exerted on the separation roller 71 (shaft 79) when driving in the advancement direction is applied from the conveyance roller 74. Accordingly, the drive transmission force is wastefully expended and heating due to overload may also arise.

SUMMARY OF THE INVENTION

With the purpose of solving the above mentioned problems, it is an object of the present invention to propose a drive transmission system provided with a low-cost one-way clutch having a simple assembly without the requirement of high precision parts.

In order to achieve the aforementioned object, a first aspect of the present invention is a drive transmission system that links a drive shaft with a free shaft via a link member, where a cam member is formed on the drive shaft and the link member which couples with the cam member and which moves in a thrust movement along the free shaft due to those cam actions is engaged with the engagement part of the free shaft and driving is transmitted from the drive shaft to the free shaft, when the free shaft rotates in the advancement direction faster than the rotational velocity transmitted from the drive shaft, the link member is moved in a thrust movement along the free shaft in a direction opposite to the above movement of the link member by the actions of the cam and disengaged from the engagement part.

Accordingly, when the drive force of the drive shaft is transmitted to the free shaft, as the cam member of the drive shaft moves the link member in a thrusting movement along the free shaft, the link member engages with the engagement part formed on the outer periphery of the free shaft. The drive force of the drive shaft is then transmitted to the free shaft via the link member. Conversely, when the free shaft rotates faster than the rotational velocity transmitted from the drive shaft, the link member is moved in a thrusting movement opposite to the above by the cam actions of the cam member of the drive shaft and enters a non-engaged state with the engagement part of the free shaft. As a result, the free shaft freely rotates regardless of the rotation of the drive shaft.

In addition to the above, a second aspect of the present invention is the formation on the link member of a coupled part that couples with the engagement part and that link member is moved in a thrust movement along the free shaft by being guided along the guide surfaces arranged between that engagement part and the coupled part. Accordingly, smooth movement results from the movement applied by the guide surfaces of the link member and engagement part when the link member is moved in a thrust movement along the free shaft.

A third aspect of the present invention is that the aforementioned free shaft is a separation roller of a facsimile device and is used for separating the documents to be scanned. Accordingly, the separation roller is rotated in the advancement direction by the conveyance roller via the scanned document and if the rotation is faster than the rotational velocity transmitted from the drive shaft, it enters a non-engaged state with the engagement pin of the separation roller. As a result, the separation roller freely rotates despite the driving of the drive shaft and a gap is opened between scanned documents.

BRIEF DESCRIPTION OF THE DRAWINGS

FIG. 8A to FIG. 8D are summarized views of the preferred exemplary embodiment of an unwound circular first cam part and a second cam part in order to describe the coupling movements of the link cam and the main cam, where FIG. 8A is the state where transmission of the drive force of the drive shaft is possible, FIG. 8B is a mid-point state where both cam parts have retracted from each other, FIG. 8C is a state where the contact surfaces of the first cam part and second cam part are in contact and FIG. 8D is the state where the first cam part and second cam part have started to couple once again.

FIG. 9A is the non-engaged state, FIG. 9B is the state where the guide surfaces are in contact and FIG. 9C is the engaged state.

FIG. 10A is the engaged state, FIG. 10B is the state where the guide surfaces are in contact and FIG. 10C is the non-engaged state.

FIG. 11 is a explanatory drawing describing the principles of a conventional separation roller.

DETAILED DESCRIPTION OF THE PREFERRED EXEMPLARY EMBODIMENT

Hereafter, the drive transmission system of the present invention realized on a facsimile device will be described based on the drawings.

Figure 7:
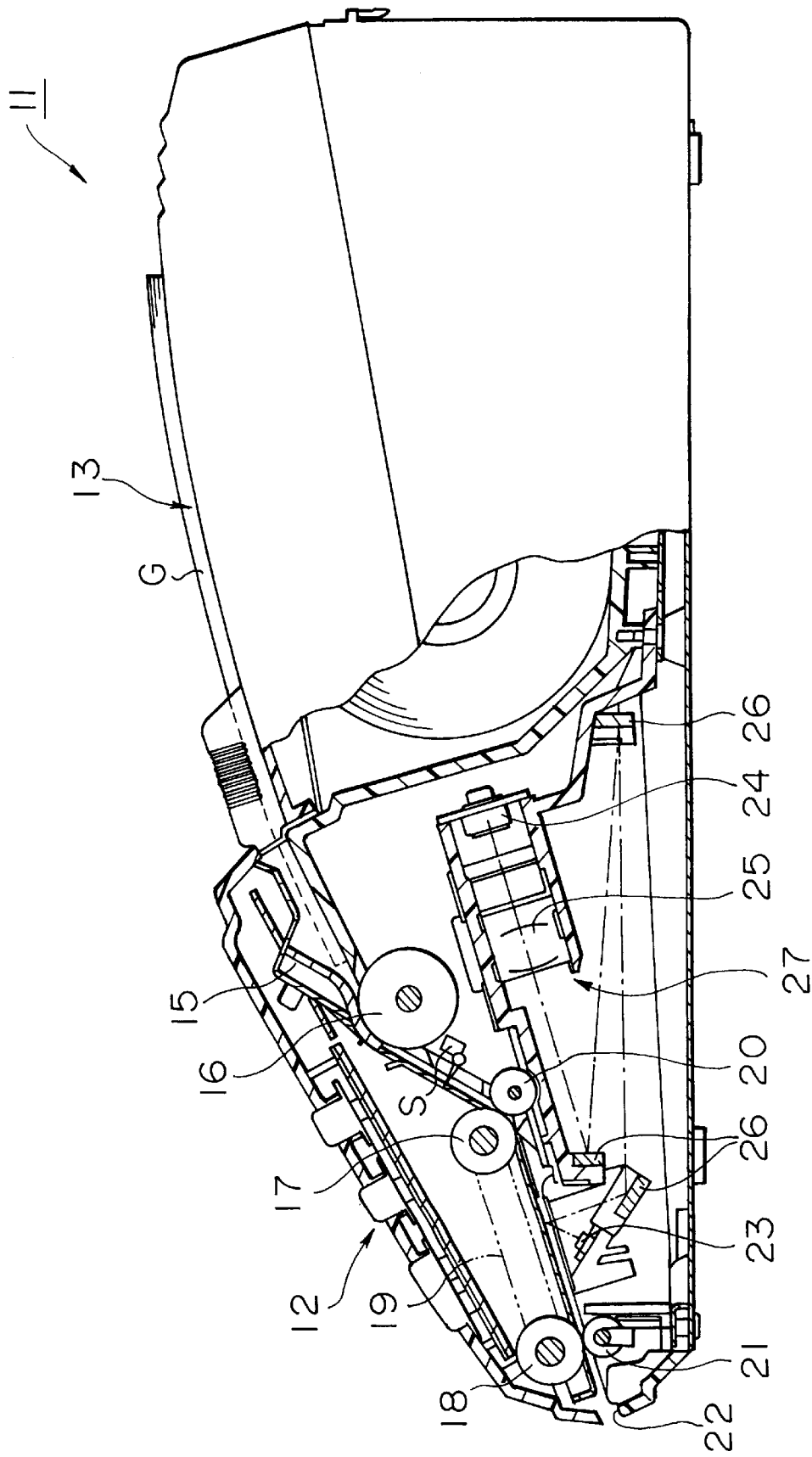
FIG. 7 is a partially exposed side view of the preferred exemplary embodiment applied to a facsimile device.

As shown in FIG. 7, an operation part 12 is formed on the front upper surface of a facsimile device 11 and a document tray 13 in which documents G to be scanned are loaded is formed on the rear upper surface. A separation roller 16 is arranged inside the facsimile device 11, is the front edge of the document tray 13 and transports documents G one sheet at a time to the downstream side with the assistance of a separation pad 15. A conveyance roller 17 is attached downstream of the separation roller 16 and a paper discharge roller 18 is attached downstream of the conveyance roller 17. The paper discharge roller 18 is driven by a motor (not shown in the drawing) and this driving action is transmitted to the conveyance roller 17 via a timing belt 19. Free rollers 20,21 corresponding to the conveyance roller 17 and the paper discharge roller 18 are arranged so as to be freely rotatable. The document G is transferred while being supported by rollers 17,18,20,21 and the document G which has been scanned is ejected from a document ejection opening 22. A passage sensor S for detecting the passage of the document G is positioned between the separation roller 16 and the conveyance roller 17. The size and number of pages of the scanned document G are detected based on detection signals from the passage sensor S.

Optical parts 27 that comprise each kind of optical member such as a light source 23, CCD image sensor 24, lens 25 and a plurality of mirrors 26 for the scanning of the details of the document G is compactly positioned in the front lower part of the facsimile device 11.

Figure 1:
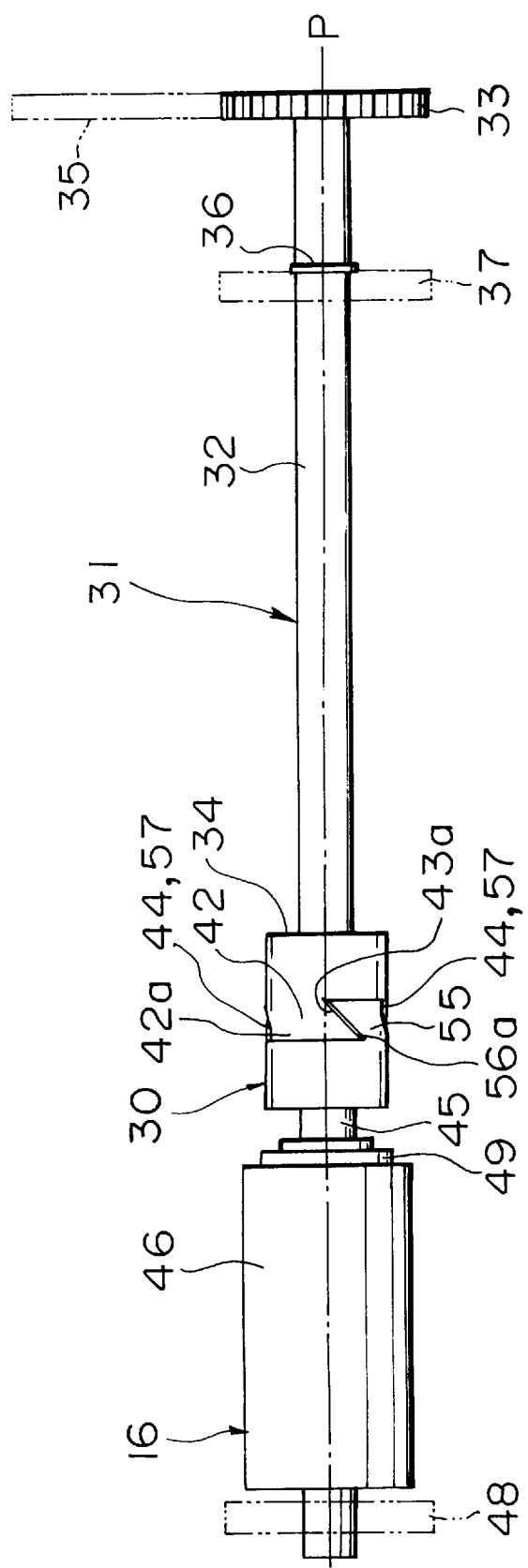
FIG. 1 is a plan view of the preferred exemplary embodiment of the drive transmission system of the present invention and shows the state where drive transmission from the drive shaft is possible.

Next, the drive transmission system of the separation roller 16 will be described based on FIGS. 1 to 10. It should be noted that in the following description, "right" refers to the right of FIGS. 1 and 2, and "left" refers to the left of FIGS. 1 and 2. As shown in FIG. 1, the separation roller 16 is driven by the drive shaft 31 via a link cam 30 being a link member.

Figure 2:
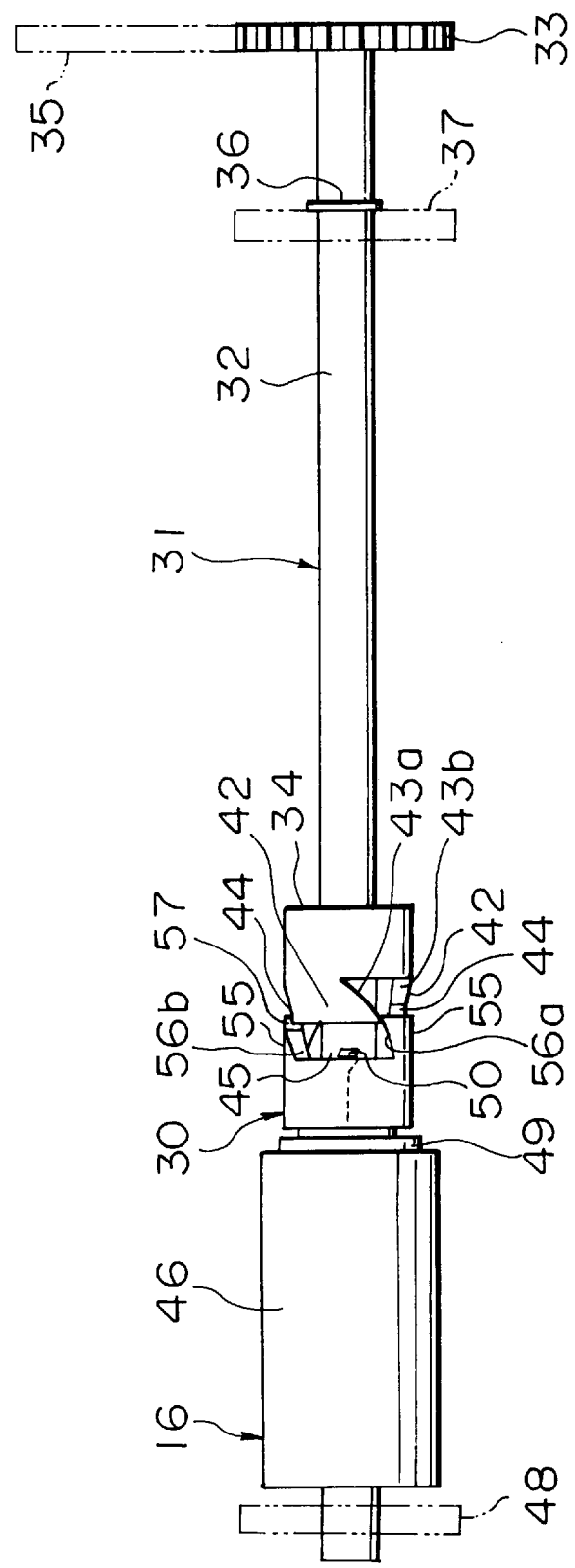
FIG. 2 is a plan view of the preferred exemplary embodiment of the drive transmission system of the present invention and shows the state where drive transmission from the drive shaft is impossible.
Figure 3:
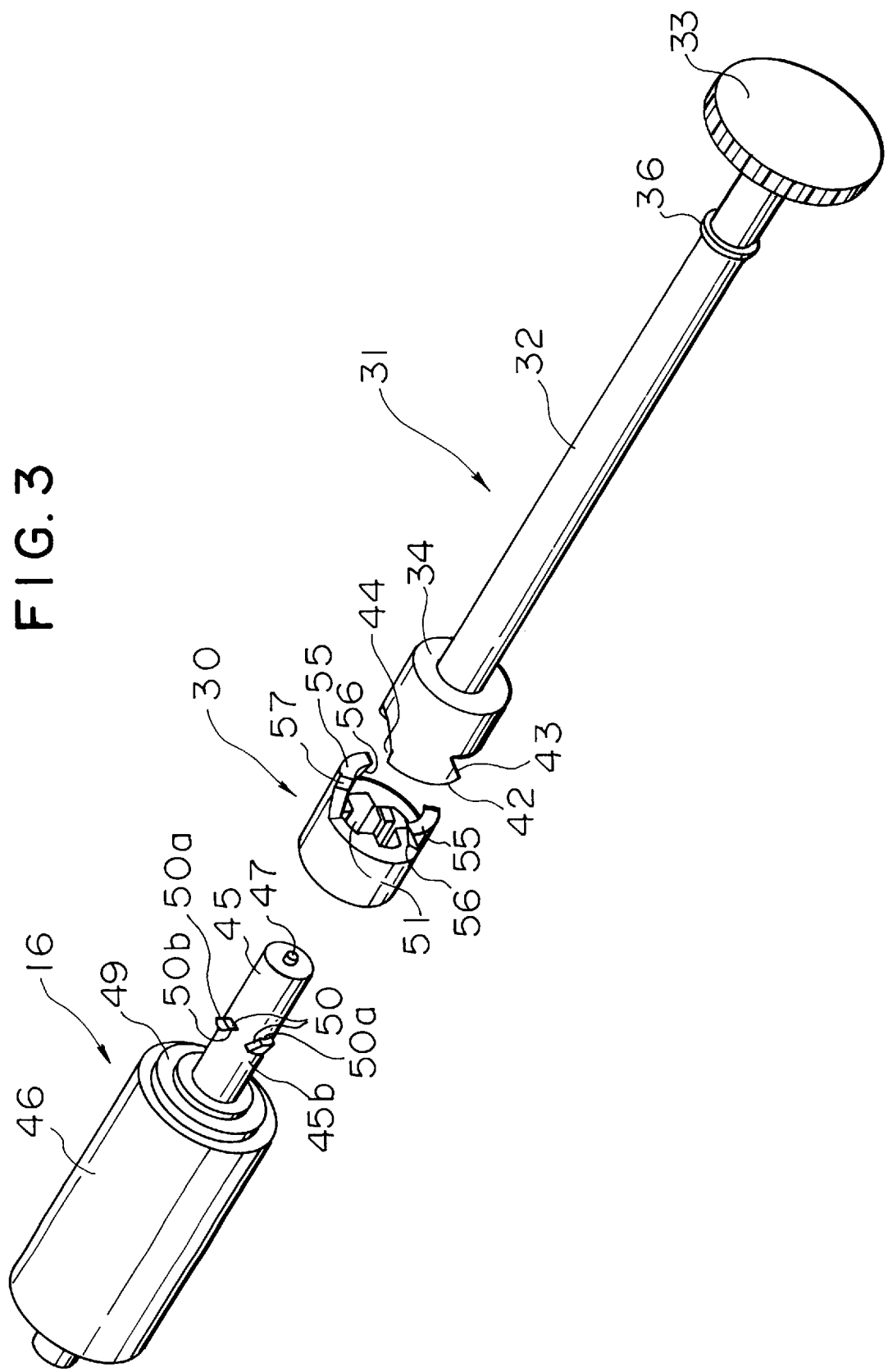
FIG. 3 is an exploded perspective view of the preferred exemplary embodiment.
Figure 6A:
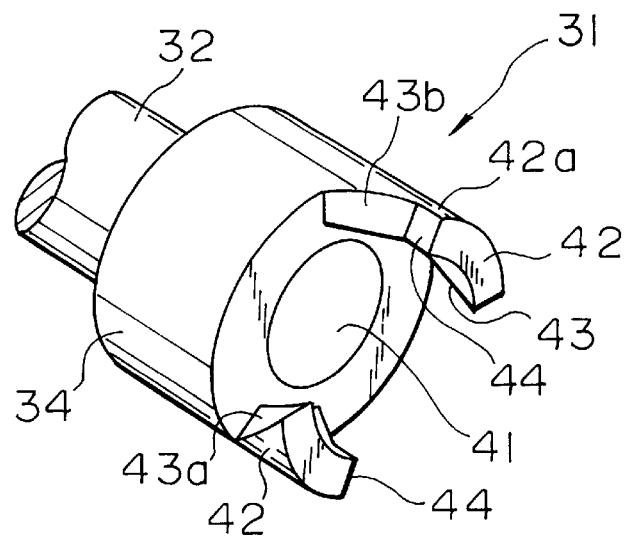
FIG. 6A and FIG. 6B are perspective views of the tip of the drive shaft of the preferred exemplary embodiment.
Figure 6B:
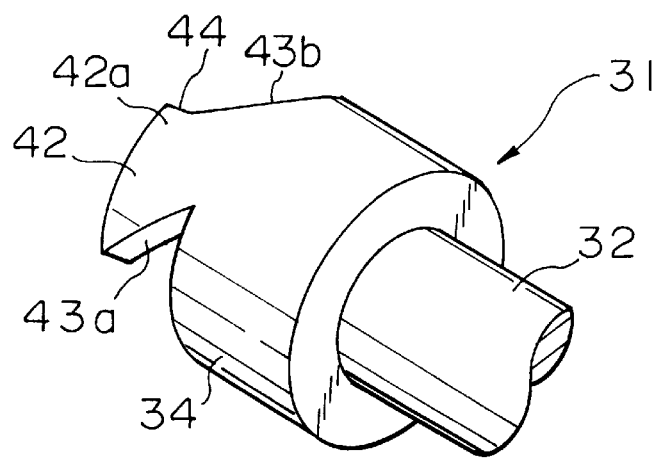
Figure 6C:
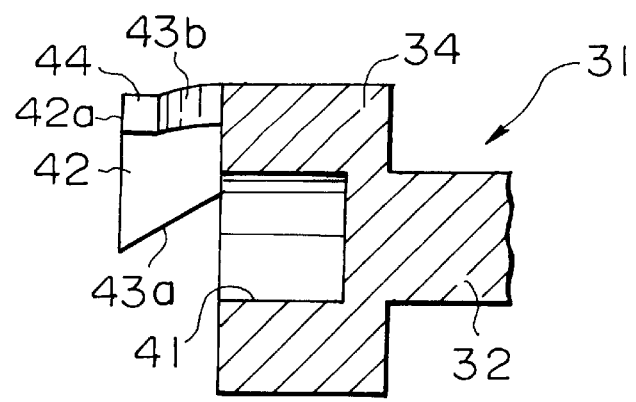
FIGS. 6C is a sectional view of the tip of the drive shaft of the preferred exemplary embodiment.

As shown in FIGS. 1 to 3, a polyoxymethylene (hereafter, abbreviated POM) resin drive shaft 31 is comprised of a shaft 32, a gear 33 and a main cam 34 being the cam member. The gear 33 formed on the right end of the shaft 32 meshes with a transmission gear 35 that transmits the drive of the motor and the drive shaft 31 rotates as a result of the drive force transmitted from the transmission gear 35. The shaft 32 is supported by a bearing 37 to the left of the small flange 36 formed close to the transmission gear 35. The main cam 34 is formed on the left end of the shaft 32. As shown in FIGS. 6A to 6C, a concave part 41 with a circular cross-section is formed in the center of the end of the main cam 34. A pair of first cam parts 42 are arranged projecting towards the left on the main cam 34. Both first cam parts 42 are arranged at positions 180 degrees apart around the outer periphery of the main cam 34. As shown in FIG. 1 and FIGS. 8A to 8D, a pair of cam surfaces 43a,43b having an inclination 45 degrees with respect to the straight line P passing through the central rotation axis of the drive shaft 31 are arranged on both first cam parts 42. It should be noted that, as shown in FIG. 6A, the cam surfaces 43a,43b are formed slanting in the clockwise direction when the drive shaft 31 is seen from the direction (left direction) of the separation roller 16. A right-angled part 42a being the tip of both first cam parts 42 is formed on rear cam surface 43b. A contact surface 44 parallel with the straight line P passing through the central rotation axis of the drive shaft 31 is formed on the right-angled part 42a.

Figure 5:
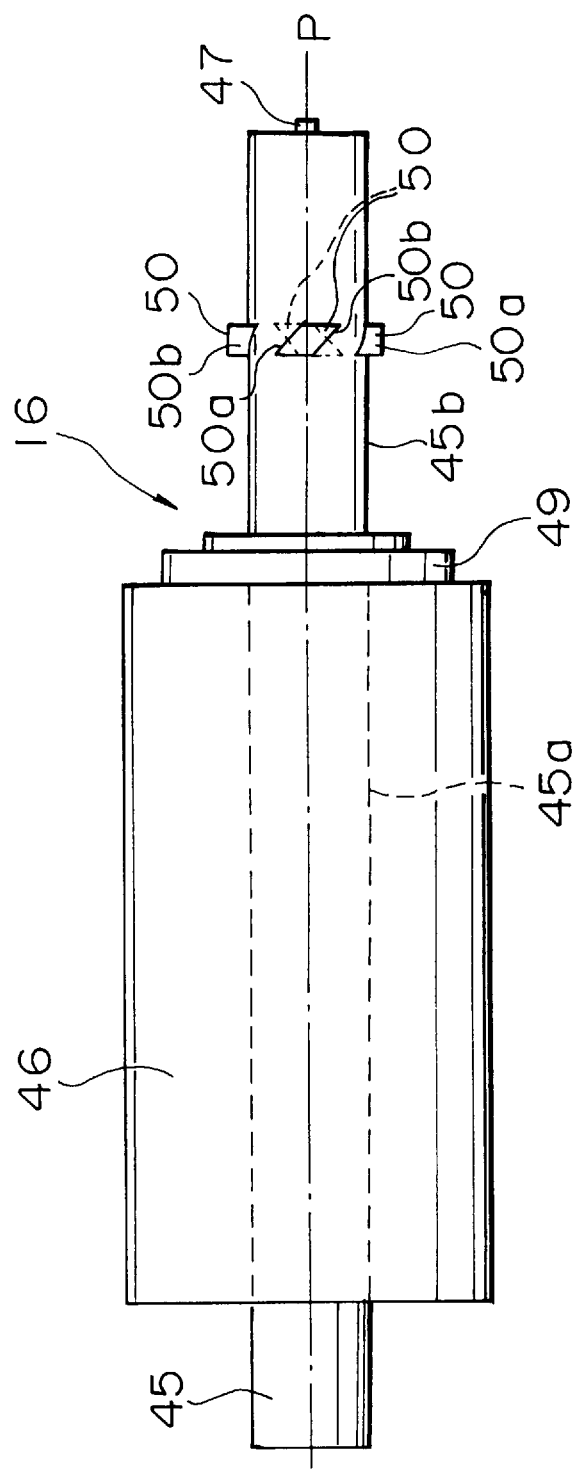
FIG. 5 is a side view of the separation roller of the preferred exemplary embodiment.

As shown in FIG. 5, the separation roller 16 comprises a shaft 45 being a free shaft and a roll pad 46. The shaft 45 is formed from POM resin and the roll pad 46 is formed from synthetic rubber. The shaft 45 is supported by the tip (right side in the drawing) being inserted in the concave part 41 formed in the main cam 34 of the drive shaft 31. A contact pin 47 formed in the center of the end surface of the shaft 45 contacts the base of that concave part 41 and ensures that the shaft 45 and the drive shaft 31 are able to rotate relative to one another. The shaft 45 is supported by a bearing 48 at the basal side (left side in the drawing).

A flange 49 for positioning of the roll pad 46 is formed on the cylindrical shaft 45 and either side of this flange 49 is a roll pad attachment part 45a to the left and a link cam attachment part 45b to the right. The roll pad 46 is attached to the roll pad attachment part 45a so that it is in contact with the flange 49. Four engagement pins 50 forming the engagement part project at equal intervals around the circumference of the periphery of the link cam attachment part 45b towards the flange 49. The plan view of the engagement pins 50 is approximately diamond-shaped and, as shown in FIG. 5 and FIG. 9, each engagement pin 50 is arranged with a pair of parallel first guide surfaces 50a,50b having an inclination of 45 degrees with respect to the straight line P passing through the central rotation axis of the shaft 45.

Figure 4A:
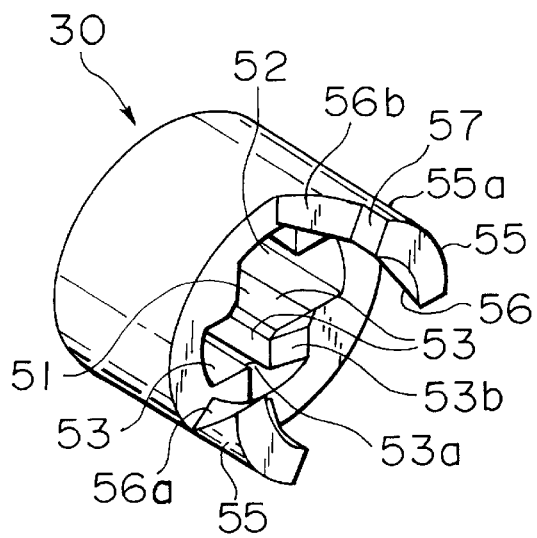
FIG. 4A and FIG. 4B are perspective views of the link members of the preferred exemplary embodiment.
Figure 4B:
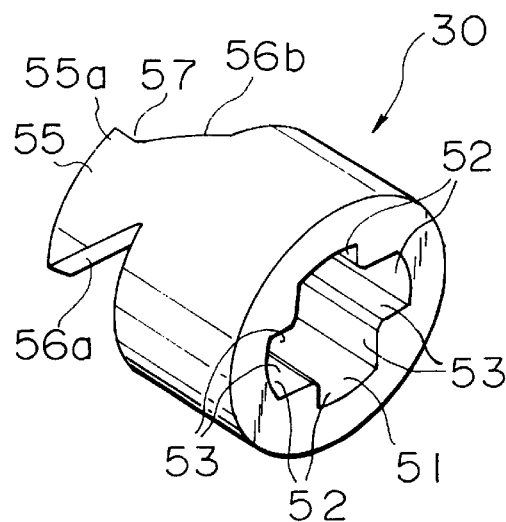
Figure 4C:
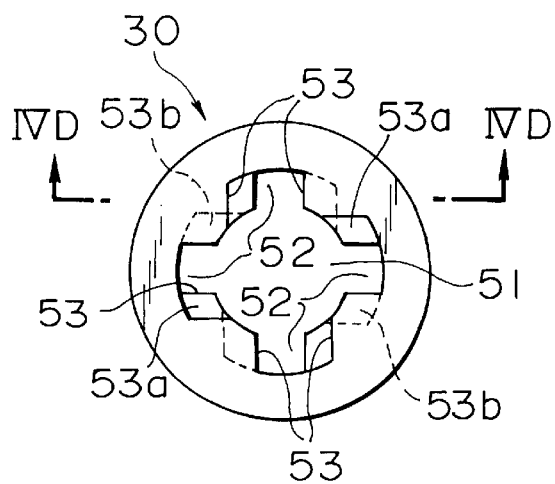
FIG. 4C is a side view of the link member of the preferred exemplary embodiment.
Figure 4D:
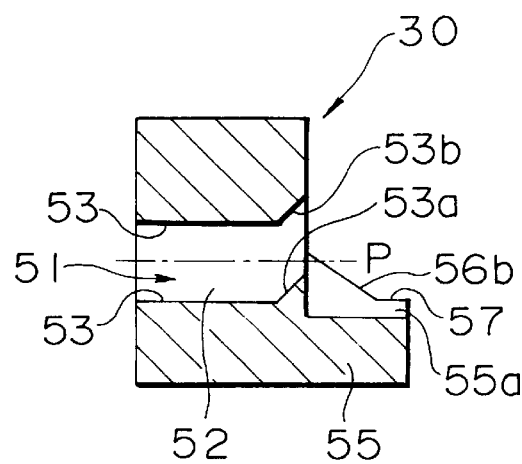
FIG. 4D is a sectional view along the line IVD—IVD of FIG. 4C.

The link cam 30 is loosely fitted to the link cam attachment part 45b of the shaft 45. As shown in FIGS. 4A to 4D, the link cam 30 is POM resin ring shape in which a hole 51 is bored in the center of the axial direction. Grooves 52 being the coupled parts with which the four engagement pins 50 couple are arranged in the axial direction of the hole 51 and as a result, the hole 51 has a cross-shaped cross-section. As shown in FIG. 4D, a pair of guide surfaces 53a are arranged in wall surface 53 formed in the groove 52 toward the right side open end of the hole 51. Both guide surfaces 53a,53b are positioned parallel to each other having an inclination of 45 degrees with respect to the straight line P passing through the central rotation axis of the shaft 45. Also, as shown in FIG. 10, the guide surfaces 50a,50b of the engagement pin 50 and the guide surfaces 53a,53b of the wall surfaces 53 contact when either the link cam 30 carries out a thrusting movement along the free shaft and the groove 52 and engagement pin 50 engage or when the device moves from a engaged state to a non-engaged state. As a result, the engaging/non-engaging movement of the engagement pin 50 and the groove 52 is carried out smoothly. It should be noted that this movement will be described later.

A pair of second cam parts 55 are arranged on the link cam 30 projecting to the right. Both second cam parts 55 are arranged at positions 180 degrees apart around the end of the outer periphery of the link cam 30. As shown in FIG. 1 and in FIGS. 8A to 8D, a pair of cam surfaces 56a,56b having an inclination 45 degrees with respect to the straight line P passing through the central rotation axis of the shaft 45 are arranged on both second cam parts 55. It should be noted that, as shown in FIG. 4A, the cam surfaces 56a,56b are formed slanting in the clockwise direction when the link cam 30 is seen from the direction (right direction) of the drive shaft 31. A right-angled part 55a being the tip of both second cam parts 55 is formed on the rear cam surface 56b. A contact surface 57 parallel with the straight line P passing through the central rotation axis of the drive shaft 31 is formed on the right-angled part 55a.

Next, the actions of the present embodiment will be described.

Figure 9A:
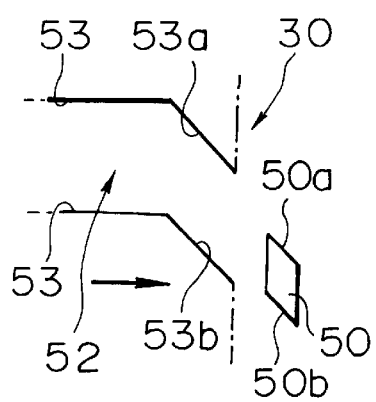
FIG. 9A to FIG. 9C are summarized views of the preferred exemplary embodiment describing the movements from the non-engaged state to the engaged state of the engagement pin and the groove, where
Figure 9B:
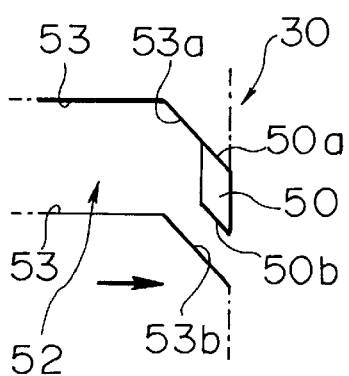
Figure 9C:
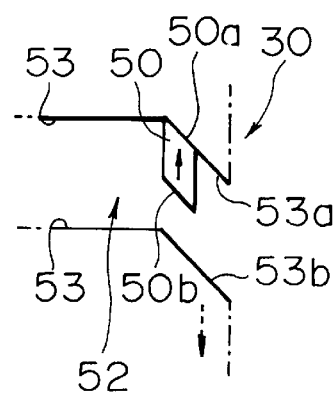

FIG. 1 and FIG. 8A show the state where the link cam 30 is moved in a thrust movement along the free shaft in the direction of the drive shaft 31 and transmission of the driving of the drive shaft 31 to the separation roller 16 becomes possible by the coupling of the main cam 34 of the drive shaft 31 and the link cam 30. In this state, the engagement pin 50 is in a engaged state with the groove 52 inside the hole 51 of the link cam 30 as shown in FIG. 9C. From FIG. 1, when the drive shaft 31 is rotated in a counter-clockwise direction (advancement direction) as when the link cam 30 is seen from the direction of the drive shaft 31, a driving force is transmitted from a first cam part 42 to a second cam part 55 as the pair of cam surfaces 43a,56a mesh together. Accordingly, when the drive shaft 31 is rotated, the link cam 30 is rotated in the same direction. As a result of the link cam 30 rotating, an upwards moment is applied to the engagement pin 50 in FIG. 9C relative to the groove 52 and driving is transmitted to the shaft 45 of the separation roller 16. In short, as the drive force of the drive shaft 31 is transmitted to the separation roller 16, the lower-most of the documents G is sent downstream. However, in this state, the document G has not yet reached the conveyance roller 17 and has not yet been applied with the delivery driving from the conveyance roller 17.

Next, the front edge of the document G reaches the conveyance roller 17. When a delivery movement is started to be applied to the document G from the conveyance roller 17, the separation roller 16 is rotated in the advancement direction by the conveyance roller 17 via the document G regardless of the rotation applied by the drive shaft 31. At this point, the rotational velocity in the advancement direction of the separation roller 16 is faster than the rotational velocity of the drive shaft 31. Accordingly, a relative reverse rotation is applied to the link cam 30 from the engagement pin 50 of the shaft 45 of the separation roller 16. As a result, the engagement pin 50 in the state as shown in FIG. 9C is applied with a relative downwards moment with respect to the groove 52 due to the drive force of the shaft 45 of the separation roller 16 and the guide surface 50a of the engagement pin 50 separates from the guide surface 53a of the wall surface 53.

Thus, the cam surfaces 43a,56a of, respectively, the first cam part 42 (main cam 34 side) and the second cam part 55 which are in contact in the coupled state as in FIG. 8A start to separate, the corner of the right-angled part 42a of the first cam part 42 (main cam 34 side) contacts the cam surface 56b of the rear second cam part 55, and the corner of the right-angled part 55a of the second cam part 55 contacts the cam surface 43b of the rear first cam part 42 as shown in FIG. 8B. Then, in accordance with the rotation of the link cam 30, the link cam 30 moves in a downwards slanting direction and the movement of the link cam 30 in the thrusting direction stops when the contact surfaces 44,57 of the link cam 30 and main cam 34 contact, as shown in FIG. 8C.

Figure 10A:
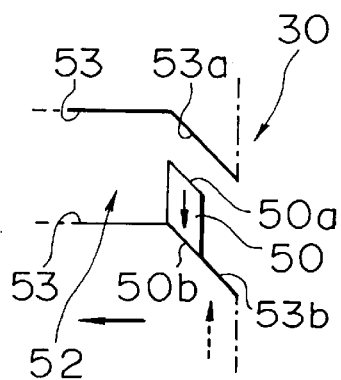
FIG. 10A to FIG. 10C are summarized views of the preferred exemplary embodiment describing the movements from the engaged state to the non-engaged state of the engagement pin and the groove, where
Figure 10B:
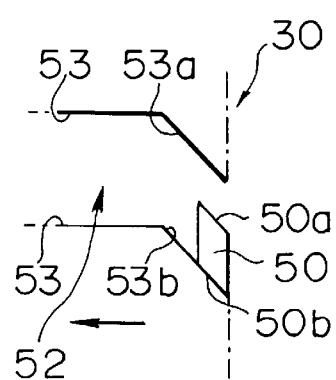
Figure 10C:
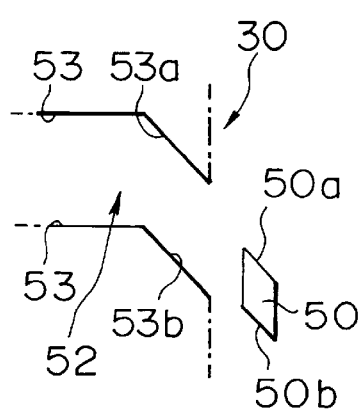
Figure 12A:
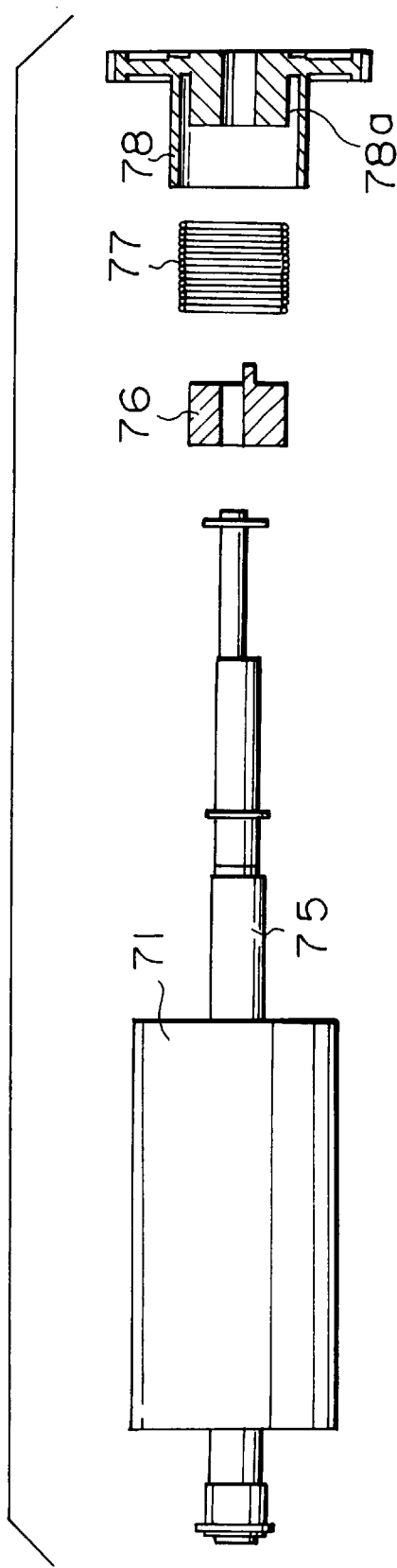
FIG. 12A is an exploded plan view of the conventional separation roller.
Figure 12B:
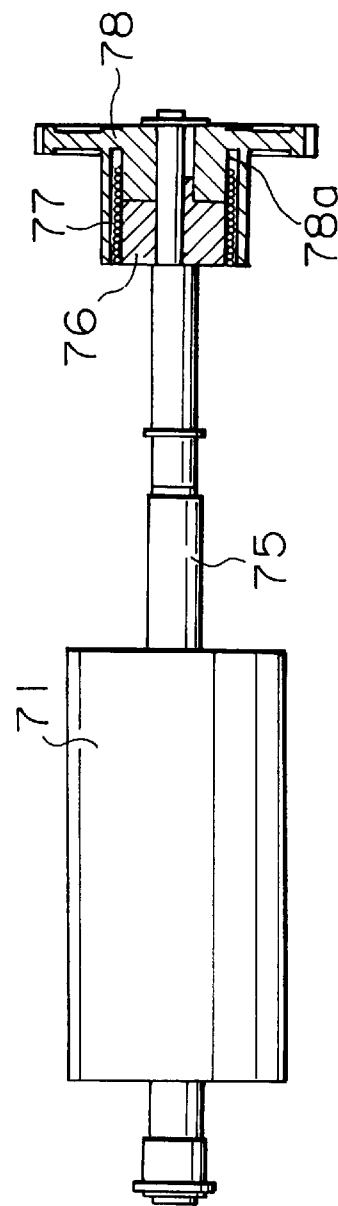
FIG. 12B is an assembled plan view of the conventional separation roller.
Figure 13A:
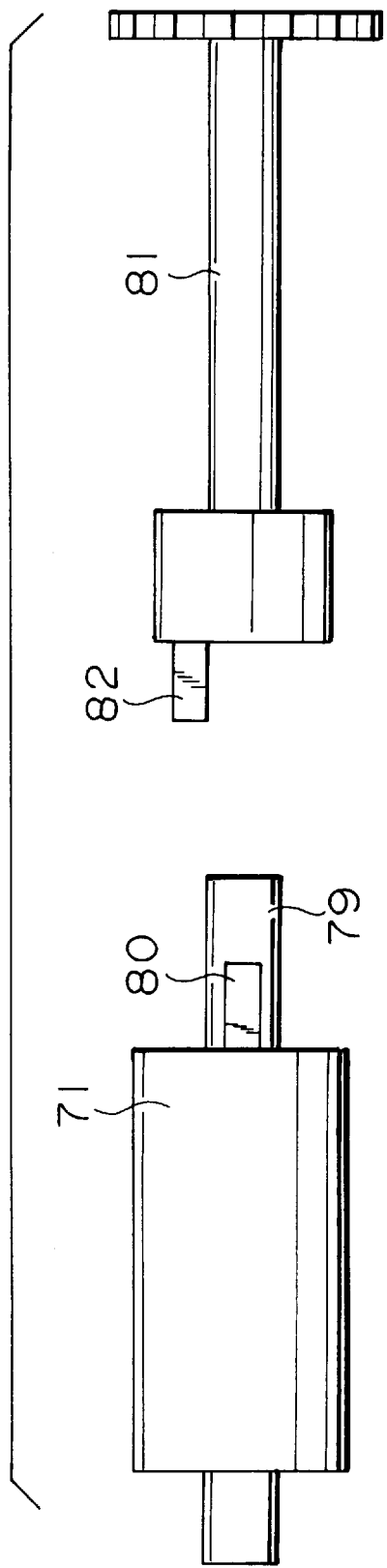
FIG. 13A is an exploded plan view of the another conventional separation roller.
Figure 13B:
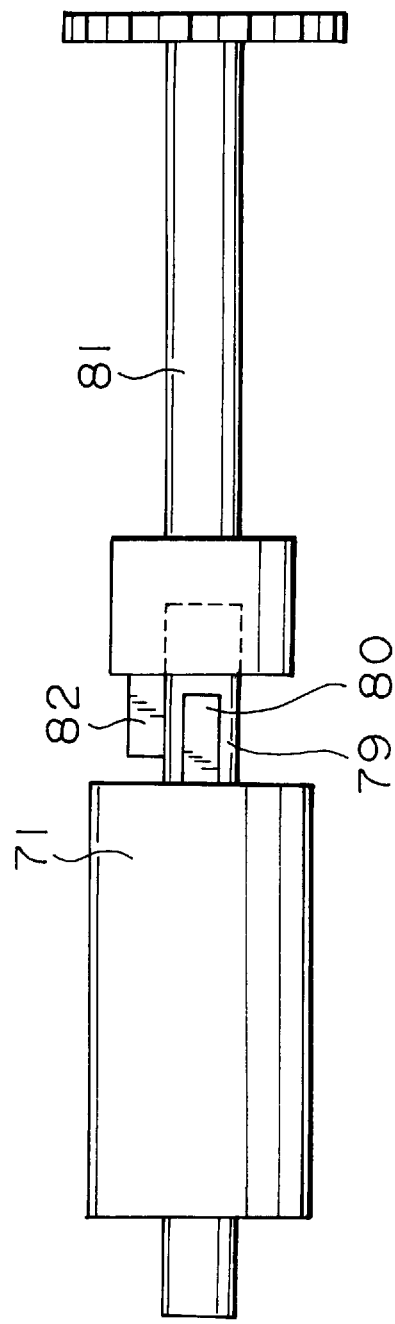
FIG. 13B is an assembled plan view of the another conventional separation roller.

Conversely, the engagement pin 50 and the groove 52 (link cam 30 side) enter a non-engaged state due to the thrust movement of this link cam 30 along the free shaft. In short, the engagement pin 50 which has moved relative to the groove 52 from the state shown in FIG. 9C moves inside the groove 52 towards the guide surface 53b as shown in FIG. 10A. Then, the guide surface 50b of the engagement pin 50 and the guide surface 53b contact. The engagement pin 50 is guided along the same guide surface 53b, moves diagonally downwards as in FIG. 10B and enters a non-engaged state by separating from the groove 52 as shown in FIG. 10C. In short, it is in the drive transmission state shown in FIG. 2. In this state, the separation roller 16 is not coupled with the drive shaft 31 and is able to freely rotate in the advancement direction. The document G is then ejected from the document ejection opening 22 while being moved along the conveyance roller 17 and the paper ejection roller 18.

Next, when the previous document G has separated from the separation roller 16, the driving from the conveyance roller 17 to the separation roller 16 is no longer applied. Accordingly, a drive force is once again applied to the separation roller 16 from the drive shaft 31. Thus, from the state of FIG. 8C of the link cam 30 and the main cam 34 (where the contact surfaces 44,57 are in contact), the link cam 30 rotates relatively to the right of the drawing as shown in FIG. 8D and the first cam part 42 (main cam 34 side) contacts once again with the cam surfaces 43a,56a of the second cam part 55 (link cam 30 side). As a result of the actions of both cam parts 42,55, the link cam 30 is pulled in the direction of the drive shaft 31 (thrust direction).

Accordingly, both cam surfaces 43a,56a of the first and second cam part 42,55 mesh again as shown in FIG. 8A and the drive force of the drive shaft 31 is transmitted to the link cam 30. At this point, the engagement pin 50 and the groove 52 (link cam 30 side) in the non-engaged state, once again enter a engaged state. In short, the engagement pin 50 and the groove 52 (link cam 30 side) in the non-engaged state, as shown in FIG. 9A, approach each other in association with the movement of the link cam 30 in the thrust direction, and the guide surface 50b of the engagement pin 50 contacts the guide surface 53b of the wall surface 53. Furthermore, the engagement pin 50 is guided along the same guide surface 53b and the engagement pin 50 and groove 52 re-engage, as shown in FIG. 9C. As a result of the rotation of the link cam 30, the engagement pin 50 is applied with an upwards moment relative to the groove 52, as shown in FIG. 9C, and a drive force is transmitted to the shaft 45 of the separation roller 16.

In short, as the drive force of the drive shaft 31 is transmitted to the separation roller 16, the next document G is sent downstream. At this point, a space is opened between the previous document G and the subsequent document G due to the difference in movement speed with the previous document G.

The aforementioned embodiment demonstrates the following advantages due to a structure as described above.

(1) Without using a conventional clutch spring, when an advancement direction driving is applied, the separation roller 16 is able to freely rotate due to the link cam 30. In particular, because this system is not one in which drive transmission is carried out by friction as in a clutch spring, there is no free rotation caused by permeation of machine oil or dust into the device. Further, the link cam 30 is resinous and thus can easily be mass-produced and reduces cost. Yet further, as assembly of the device simply involves insertion of the link cam 30 into the shaft 45, no time is spent on assembly operations. Yet further still, less precision is required for the dimensions of the materials as that for a clutch spring, the yield is high.

(2) When the link cam 30 carries out a thrusting movement, the engagement pin 50 and the groove 52 easily engage as the guide surfaces 50a,50b (shaft 45 side) of the engagement pin 50 contacts the guide surfaces 53a,53b formed on the wall surface 53 (groove 52 of the link cam 30 side).

(3) As shown in FIG. 8C, the link cam 30 and the main cam 34 contact at the contact surfaces 44,57 when the separation roller 16 freely rotates in the advancement direction and in this state, the link cam 30 rotates in unison with the main cam 34 (drive shaft 31). In short, the link cam 30 and the main cam 34 are in a contacted state not completely separated and the state shown in FIG. 8D may be quickly resumed when the drive force of the drive shaft 31 is transmitted to the link cam 30 side and a drive force application state, as shown in FIG. 8A, can be quickly returned to.

(4) Friction is reduced as contact with the base of the concave part 41 of the drive shaft 31 is made by the contact pin 47 on the tip of the shaft 45 and there is little load on the rotation when the separation roller 16 is freely rotating.

It should be noted that the above embodiment describes an example where the cam member is arranged on the drive shaft and the link member and engagement part are arranged on the free shaft but the objects of the present invention may be achieved even if these are reversed.

It should also be noted that the present invention is not limited to the aforementioned embodiment but may have the following structure provided the aims are not surpassed.

a) The guide surfaces 53a,53b are formed in the groove 52 formed in the link cam 30 but these are not absolutely necessary. If there are no guide surfaces in the groove 52 then there is no need for the guide surfaces 50a,50b in the engagement pin 50. However, in this case, it is preferable for the engagement pin 50 to have a circular cross-section. Furthermore, only the upper guide surface 53a of the guide surfaces formed in the groove 52 of FIGS. 9A to 9C or FIGS. 10A to 10C may be omitted. This is because the guidance and contact of when the engagement pin 50 and the groove 52 engage is at the guide surface 50b and the guide surface 53b as shown in FIGS. 9A to 9C.

b) Alteration of the number of engagement pins 50 and the number of first cam parts 42 and second cam parts 55 is possible.

c) The angle of the cam surfaces 43a,43b,56a,56b is 45 degrees on the aforementioned embodiment, but this angle need not be limited to 45 degrees.

d) Other cams may be used as a cam including flat cams and three dimensional cams. Examples of flat cams include plate cams, positive motion cams, direct cams and the like. Examples of three-dimensional cams include cylindrical cams, conical cams, spherical cams, end cams, slant plate cams and the like.

e) The present invention may be used for devices other than facsimile devices such as printers or the like. The embodiment of the present invention has been described in detail but the present invention may be freely altered provided the aims are not surpassed.

Other technological innovations realised from the aforementioned embodiment are hereafter explained together with their advantages.

(1) A drive transmission system that maintains the coupled state of the link member and drive shaft cam member when the link member is in the non-engaged state with the engagement part of the free shaft. Accordingly, after the free shaft has been freely rotating, driving is quickly re-transmitted as the link member and cam member are coupled when the drive force of the drive shaft is once again applied. In the aforementioned embodiment, the coupled state is maintained by the contact surfaces 44,57 formed on the first and second cam parts 42,55.

As described above, a first aspect of the present invention enables the production of a drive transmission system at low cost where the assembly operation takes little time. Furthermore, in comparison with conventional systems, there is no requirement for the same degree of precision and the yield is high.

A second aspect of the present invention provides a smooth engagement between the engagement part and coupled part when the link member carries out a thrusting movement along the free shaft.

A third aspect of the present invention is the opening of a space between scanned documents by the movement of scanned documents of a facsimile device or the like.

What is claimed is:

1. A drive transmission system for a separation roller in a paper sheet feeding apparatus, comprising:

a drive shaft;

a free shaft of said separation roller linked via a cam member and a link member which is able to carry out a thrust movement, wherein said cam member and said link member are both formed of resin and both have a plurality of opposed inclined surfaces, wherein the link member is able to carry out a thrust movement between an engaged position and non-engaged position with an engagement part, wherein the link member carries out a thrust movement due to the cam effects of the opposed inclined surfaces of said cam member and said link member and transmits a driving force from the drive shaft to the free shaft due to the engagement with the engagement part, and wherein when the free shaft rotates in an advancement direction faster than the rotational velocity transmitted from the drive shaft, the link member disengages from the engagement part by carrying a thrust movement in a direction opposite to the above due to the cam effects provided by the opposed inclined surfaces.

2. A drive transmission system for a separation roller in a paper sheet feeding apparatus, including a drive shaft linked with a free shaft of said separation roller via a link member, comprising:

a cam member formed on the drive shaft, both the cam member and the link member being formed of resin and both having a plurality of opposed inclined surfaces, wherein the link member which couples with the cam member and which moves in a thrust movement along the free shaft due to cam actions provided by the opposed inclined surfaces is engaged with an engagement part of the free shaft and a driving force is transmitted from the drive shaft to the free shaft, and wherein when the free shaft rotates in an advancement direction faster than the rotational velocity transmitted from the drive shaft, the link member is moved in a thrust movement along the free shaft in a reverse direction to the above movement of the link member by the actions of the cam provided by the opposed inclined surfaces and disengaged from the engagement part.

3. A drive transmission system as recited in claim 2, wherein a coupled part that couples with the engaging part is formed on the link member and said link member is guided along guide surfaces arranged on the engaging part and coupled part and is moved in a thrust movement along the free shaft.

4. A drive transmission system as in claim 2, wherein the free shaft is a shaft of a separation roller used for separating scanned documents of a facsimile device.

5. A drive transmission system as in claim 3, wherein the separation roller is used for separating scanned documents of a facsimile device.

* * * * *